United States Patent
Abe et al.

(10) Patent No.: US 6,866,487 B2
(45) Date of Patent: Mar. 15, 2005

(54) COMPRESSOR WITH BUILT-IN MOTOR AND MOBILE STRUCTURE USING THE SAME

(75) Inventors: Yoshifumi Abe, Ritto (JP); Tsutomu Sakurabayashi, Kadoma (JP); Masahiko Makino, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 60 days.

(21) Appl. No.: 10/164,637

(22) Filed: Jun. 10, 2002

(65) Prior Publication Data

US 2003/0013343 A1 Jan. 16, 2003

(30) Foreign Application Priority Data

Jun. 8, 2001 (JP) ........................................ 2001-174431

(51) Int. Cl.[7] ................................................ F04B 35/04
(52) U.S. Cl. ................................ 417/410.1; 417/410.5; 417/902
(58) Field of Search .......................... 417/410.1, 410.3, 417/410.5, 423.1, 902; 310/71, 87, 88

(56) References Cited

U.S. PATENT DOCUMENTS

| | | | | |
|---|---|---|---|---|
| 2,311,805 A | * | 2/1943 | Yost | ............................ 310/87 |
| 4,383,726 A | * | 5/1983 | Divers et al. | ............ 339/198 R |
| 4,523,798 A | * | 6/1985 | Barrows et al. | ...... 339/192 RL |
| 4,900,238 A | * | 2/1990 | Shigemi et al. | ............. 417/410 |
| 5,391,061 A | * | 2/1995 | Iizuka et al. | ............. 417/410.1 |
| 5,519,301 A | * | 5/1996 | Yoshida et al. | ............. 318/811 |
| 5,747,905 A | * | 5/1998 | Yabushita et al. | ............ 310/89 |
| 5,801,465 A | * | 9/1998 | Yamada | ........................ 310/71 |
| 6,305,989 B1 | * | 10/2001 | Quadir | ........................ 439/685 |
| 2001/0012489 A1 | * | 8/2001 | Harakawa et al. | .......... 417/371 |
| 2001/0038797 A1 | * | 11/2001 | Makino et al. | .......... 417/410.1 |

* cited by examiner

Primary Examiner—Charles G. Freay
(74) Attorney, Agent, or Firm—Greenblum & Bernstein, P.L.C.

(57) ABSTRACT

An installation flange of a terminal along with a sealing member is pressed between a connection opening and an independent member engaged with the connection opening. The connection opening may be part of the terminal, and is provided on a part of a container. Consequently, the installation flange is fixed, and the connection opening is sealed. The terminal with an iron flange can be attached to an aluminum container without increasing the weight.

19 Claims, 15 Drawing Sheets

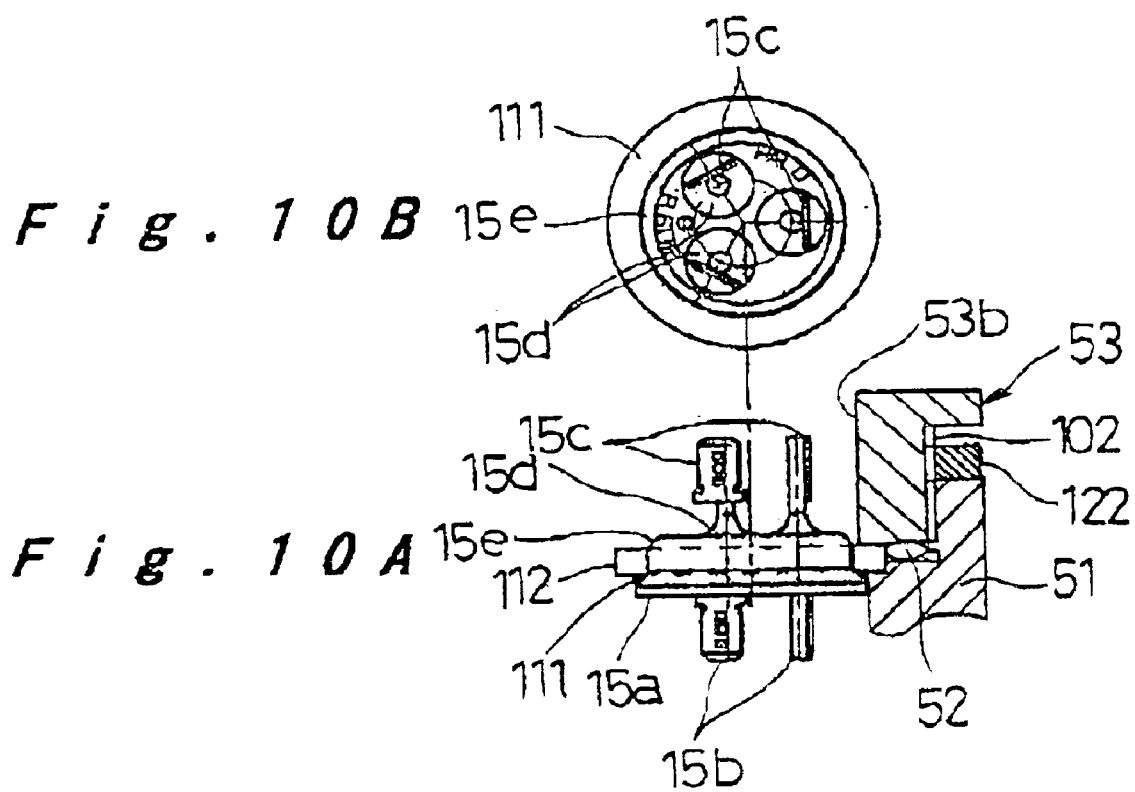

COMPRESSOR WITH BUILT-IN MOTOR AND MOBILE STRUCTURE USING THE SAME

The present disclosure relates to subject matter contained in priority Japanese Patent Application No. 2001-174431, filed on Jun. 8, 2001, the contents of which is herein expressly incorporated by reference in its entirety.

BACKGROUND OF THE INVENTION

1. Field of the Invention

The present invention relates to a compressor with a built-in electric motor which is suitable to be mounted on a mobile structure such as a motor vehicle. The invention also relates to a mobile structure having such a compressor.

2. Description of Related Art

In a vehicle driven only by an engine, a compressor driven by the engine has been used for air-conditioning the vehicle compartment with the compressor being mounted alongside of the engine.

Hybrid vehicles having both an engine and an electric motor and traveling by use of one of them according to conditions have been practically used for traveling on public roads. Air-conditioning of the vehicle compartment of this hybrid vehicle is made by a compressor driven by the engine in the same manner as conventional engine-driven vehicles, which compressor is mounted alongside of the engine.

It is proposed that the engines of hybrid vehicles should be shut off while they are temporarily stationary at places such as a traffic light in order to reduce effects of the engine upon the environment. When the proposal is followed with a vehicle where a compressor driven by the engine is used, air-conditioning stops each time when the vehicle stops, causing a problem for the driver and passengers in the compartment in summer and winter seasons, and especially in regions with extremely cold or hot climate.

For solving such a problem, there is an idea of adopting a compressor to be driven by an electric motor, especially a compressor to be used for air-conditioning in a housing as shown in FIG. 14. The compressor with a built-in electric motor is housed in a container 152 made of iron, together with a compression mechanism 150 and an electric motor 151. In the hybrid vehicle, furthermore, the arrangement of devices in an engine room is based on that of the conventional motor vehicle. Thus, there is no space or location for installing the conventional compressor with the built-in electric motor for air-conditioning in the housing within the engine room.

What is worse, the conventional compressor with the built-in electric motor has large axial dimensions. That is, a discharge port 154, a suction port 155, inner and outer electric connection parts 156, and a mounting leg portion 157 are longitudinally extended from both ends of the container 152. Such a complicated construction of the compressor is hardly incorporated in an electric-powered vehicle which has been only realized in a small-sized vehicle.

Simultaneously, the conventional compressor with the built-in electric motor is made of iron and is large, so that the total weight thereof is about 9 kg or more. Thus, it becomes a problem in realizing the high speed and the energy saving because of the increase in driving load when it is mounted on the full-sized mobile structure.

It becomes urgent business to provide a small-sized and lightweight compressor with a built-in electric motor now in a tendency of planning an electric operation of various kinds of load by using a working voltage of 42 volts in a gasoline-powered vehicle, a hybrid vehicle, or an electric-powered vehicle. For this reason, it is considered to use a small and lightweight compressor with a built-in electric motor having a container made of aluminum.

When a terminal 156 is provided on the container 152 made of iron, a weld joint 167 is used. As the weld joint 167, an installation flange 165, which is made of iron, for the terminal 156 is welded to a connection opening 166 of the container 152. On the other hand, when a compressor with a built-in electric motor has an aluminum container 158, the iron installation flange 165 cannot be welded. To solve this problem, as shown in FIG. 15, an installation flange 168 of a terminal 164 is welded to an installation plate 169 made of iron in advance, and the installation plate 169 is placed at a connection opening 171 of the container 158, and is screwed by a plurality of bolts 170. A sealing member 172 is placed between the installation plate 169 and the connection opening 171.

With this structure, the iron installation plate 169 is made relatively thick and heavy to withstand the refrigerant gas pressure. In addition, the installation plate 169 has a flange 173 for the installation using the bolts 170, and becomes large. The multiple bolts 170 for the screwing are also made of iron. Consequently, a part for installing the terminal 164 becomes even heavier than the case of the conventional compressor.

To address this problem, the installation flange 168 of the terminal 164 may be made of aluminum as the container 158 is. However, there are problems in terms of technique, time, and cost such as developing a glass seal material suitable for the aluminum installation flange.

If the conventional terminal 156 having the iron installation flange 165 can be installed on an aluminum container, this problem is adequately solved.

SUMMARY OF THE INVENTION

An object of the present invention is to provide a compressor with a built-in electric motor having a terminal installation structure suitable for installing a terminal with a flange made of iron on an aluminum container without increasing its weight. Another object of the invention is to provide a mobile structure equipped with this compressor.

To achieve the objects described above, a compressor with a built-in electric motor according to a first aspect of the present invention includes a compression mechanism, an electric motor for driving the compression mechanism, a container for housing the compression mechanism and the electric motor, and a terminal provided on a part of the container for electrically connecting the electric motor with the outside of the container. An installation flange of the terminal is pressed along with a sealing member between a connection opening for the terminal provided on the part of the container, and an independent member engaged with the connection opening. As a result, the terminal is fixed, and the connection opening is sealed.

With this constitution, since the independent member engaged with the connection opening of the container presses the installation flange of the terminal to fix the terminal, such a restriction as the material of the installation flange is the same as the material of the container is not applied. Thus, this constitution is suitable to install a terminal with an iron installation flange to an aluminum container, and is applicable to the conventional terminal. Simultaneously, since the independent member is engaged with the connection opening, special installation members such as bolts or an additional extended flange for fixing with bolts are not necessary, the terminal does not become especially heavy, or does not have a complicated structure. Further, the independent member presses the sealing member simultaneously when the installation of the terminal, and seals the connection opening of the container without a special sealing operation.

In a second aspect of the invention, an installation plate welded to the installation flange of the terminal, or an installation plate provided with the terminal is pressed along with the sealing member between the connection opening provided on the part of the container, and the independent member engaged with the connection opening to fix the terminal and to seal the connection opening.

With this constitution, since the terminal itself has the installation plate, or the installation plate is welded to the installation flange of the terminal, a similar effect to that of the compressor with a built-in electric motor of the first aspect is provided. This constitution is suitable to weld the installation plate when the installation flange has a conventional taper shape.

In a third aspect of the invention, the installation flange of the terminal, an installation plate welded to the installation flange of the terminal, or an installation plate forming the terminal is pressed along with the sealing member between the connection opening provided on the part of the container, and the independent member welded to the connection opening, so as to fix the terminal and to seal the connection opening.

With this constitution, in addition to the first and second aspects, there are no restrictions on the material of the independent member. Thus, simple welding to the connection opening fixes the terminal, and seals the connection opening using the sealing member without possibility of loosening.

In a fourth aspect of the invention, the installation flange of the terminal, an installation plate welded to the installation flange of the terminal, or an installation plate forming the terminal is engaged with a connection opening provided on a part of the container, and is fixed while the sealing member is pressed between the installation flange or the installation plate and the connection opening, so as to fix the terminal and to seal the connection opening.

With this constitution, the action and effects similar to those of the first aspect are provided when the independent member of the first aspect is not used, or when the installation plate of the independent member attached to the terminal separately is used.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIGS. 10A and 10B show still another terminal, FIG. 10A being a side view of this terminal, and FIG. 10B a plan view thereof;

DETAILED DESCRIPTION OF THE PREFERRED EMBODIMENTS

Hereinafter, a compressor with a built-in electric motor as one of preferred embodiments of the present invention and a mobile structure having such a compressor will be described with reference to the accompanying drawings for facilitating the understanding of the invention.

In this embodiment, the compressor is a scroll type compressor with a built-in electric motor to be mounted on an engine of a hybrid vehicle in a horizontal position. However, the invention is not limited to such a type of compressor. The present invention is also applicable to any compressor for air-conditioning of the interior of a room in addition to the vehicle compartment of a typical mobile structure such as a motor vehicle, exerting the advantages of weight reduction and miniaturization. According to the invention, various kinds of compression mechanisms, for example rotary and reciprocation type compression mechanisms, may be used. Furthermore, any vertical type compressor may be used.

Figure 1:
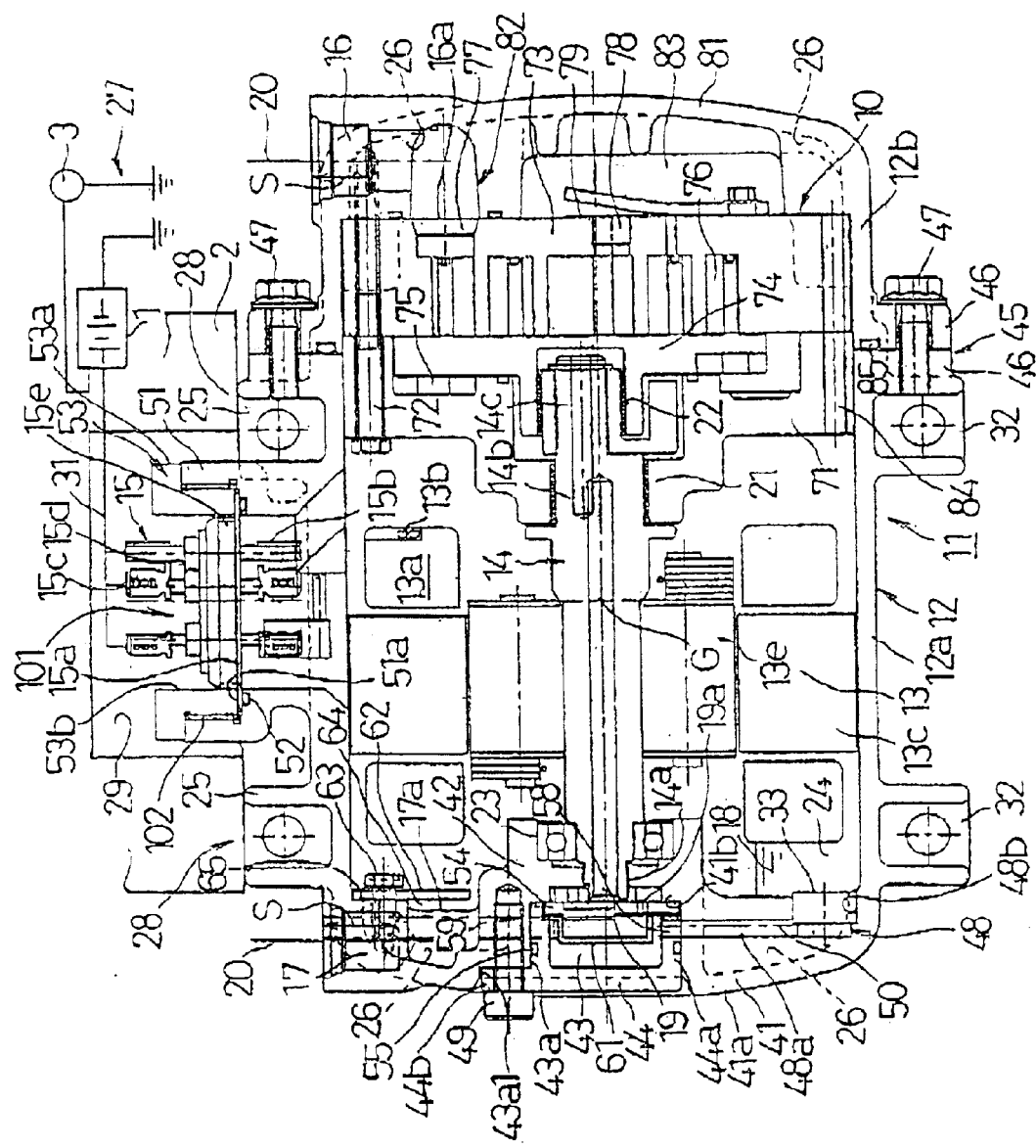
FIG. 1 is a cross sectional view showing a compressor with a built-in electric motor in a state of being mounted on an engine according to one embodiment of the present invention.
Figure 2:
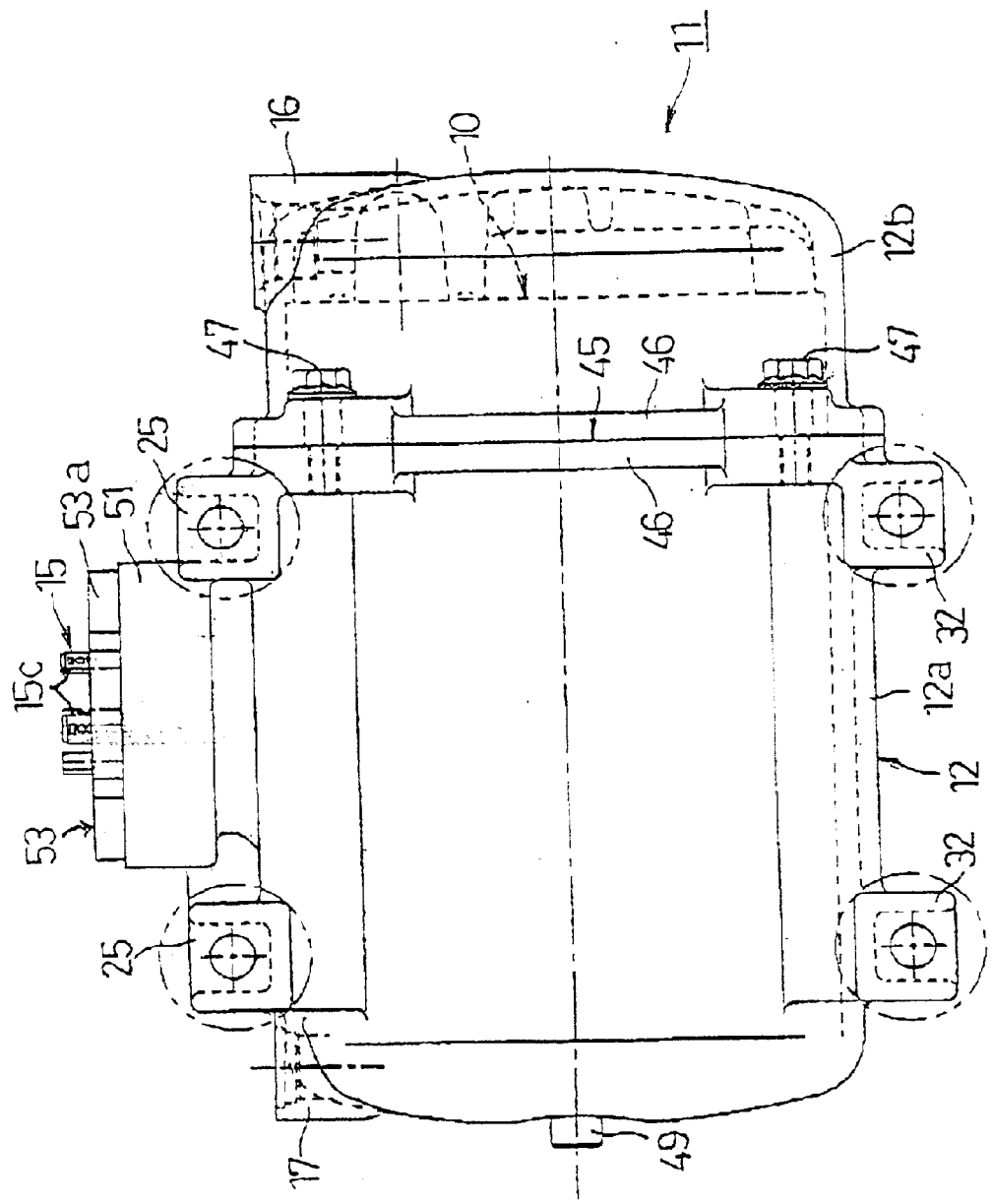
FIG. 2 is a front view of the compressor in FIG. 1.
Figure 3:
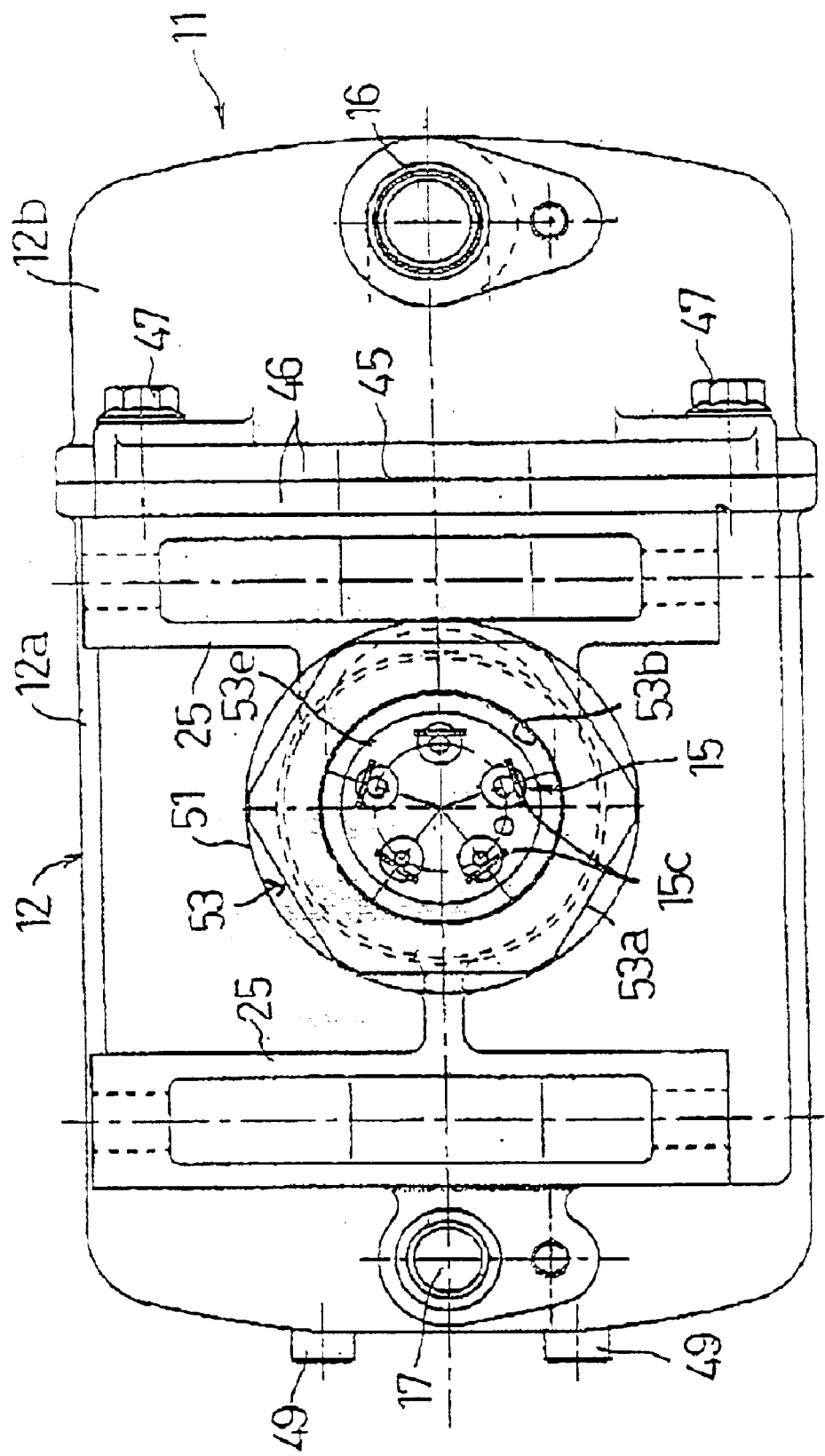
FIG. 3 is a plan view of the compressor in FIG. 1.

As shown in FIG. 1, a hybrid vehicle 27 includes a gasoline-powered engine 2 and a motor 3 to be driven by the supply of power from a battery 1. The battery 1 is a rechargeable battery. While the vehicle runs using the engine 2, the battery 1 is charged. While the battery 1 has a sufficient charged capacity, the motor 3 is controlled to receive the supply of power for driving the vehicle with the motor 3 to restrict the discharge of exhaust gas to a minimum. When the vehicle is running with the engine 2, the engine 2 is controlled such that the engine 2 is stopped while the vehicle is temporally stopped, for example at a traffic light.

In this embodiment, as shown in FIG. 1, a compressor 11 driven by a built-in electric motor 13 is used for an air-conditioning of the vehicle compartment of the hybrid vehicle. The compressor 11 is constructed to keep the air-conditioning of the vehicle compartment even though the vehicle running with the engine 2 is temporally stopped at a traffic light or the like and the engine 2 is stopped.

As shown in FIG. 1, a scroll type compression mechanism 10 and the electric motor 13 having a driving shaft 14 to drive the compression mechanism 10 are housed in a container 12 to constitute the compressor 11. The electric motor 13 is operated by the supply of power through a terminal 15 provided as inner and outer electric connection parts of the container 12 to actuate the compression mechanism 10. The compression mechanism 10 inspires a refrigerant after passing through a refrigeration cycle via a suction port 16 of the container 12 to compress the refrigerant. Then, the compressed refrigerant is discharged into the inside of the container 12 to cool the electric motor 13, followed by discharging the refrigerant into an external pipe 20 outside the container 12 via a discharge port 17 of the container 12 to supply the refrigerant to the refrigeration cycle for air-conditioning. Subsequently, these steps are repeated. The terminal 15 includes an inner terminal 15b, and an external terminal 15c. In addition, the terminal 15 has a sealing structure. That is, the inner and external terminals 15b, 15c are connected to each other and pass through an installation flange 15a and a body part 15e, where the passing-through portion is sealed with a sealant such as a glass sealant to form it as a sealing portion 15d.

In the container 12, there is oil 18 being stored. The oil is inhaled by a pump 19 driven by the driving shaft 14. The oil is then supplied to a main bearing 21 of a main axial part 14b of the driving shaft 14 on the side of the compression mechanism 10, a bearing 22 of a coupling portion between the main axial part 14b and the compression mechanism 10, and a sliding portion of the compression mechanism 10 to make smooth. After lubricating the bearings and the sliding portion, the oil 18 seeps through each lubricating object by means of a supply pressure and then returns to the inside of the container 12, followed by repeating such a lubricating process. By means of the action of a compatibility, a part of the refrigerant to be discharged into the container 12 brings the oil 18 stored in an oil storage portion 24 in the container 12 into a part such as a sub-bearing 23 which cannot be supplied with oil 18 by the pump 19, lubricating the sub-bearing 23 or the like. The sub-bearing 23 is responsible for bearing a sub-axial part 14a on the side of the driving shaft 14 opposite to the compression mechanism 10. Consequently, the compressor 11 having the built-in electric motor of the present embodiment satisfies the requirements for maintenance free.

Figure 14:
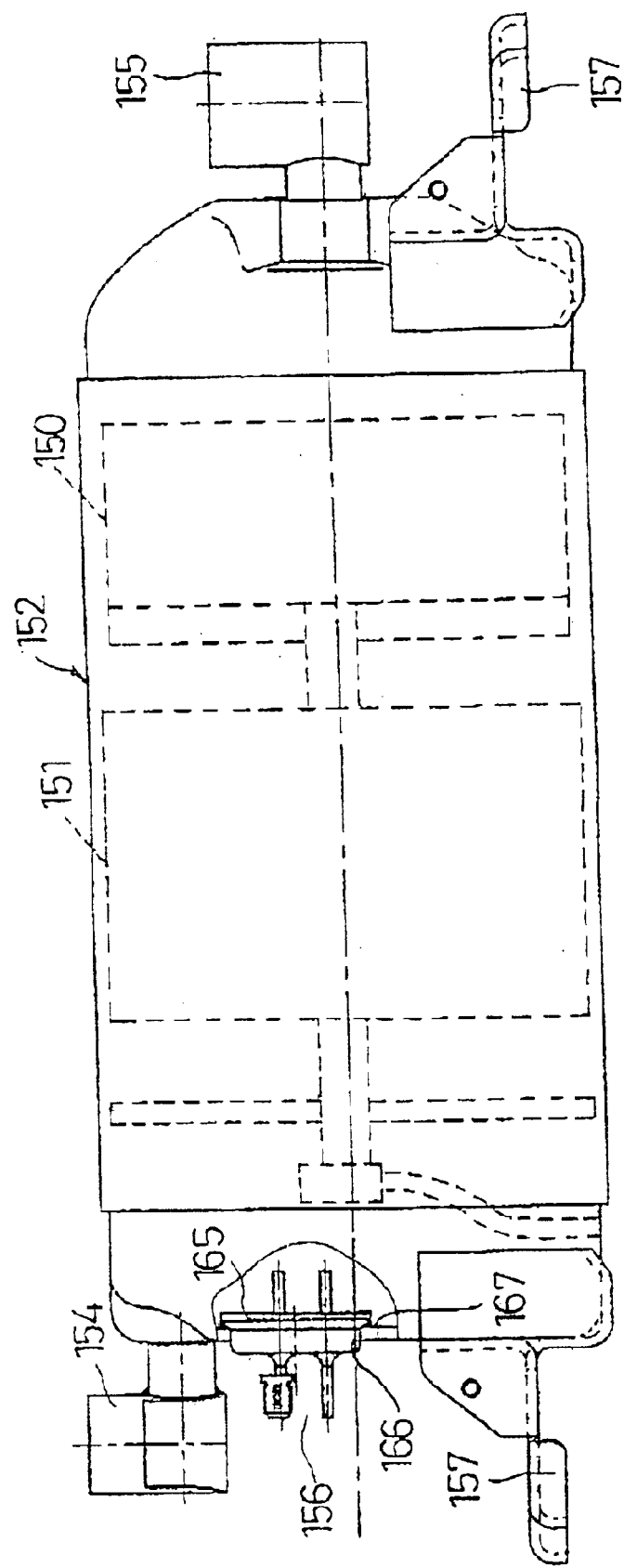
FIG. 14 is a side view showing a conventional compressor with a built-in electric motor housed in an iron container.
Figure 15:
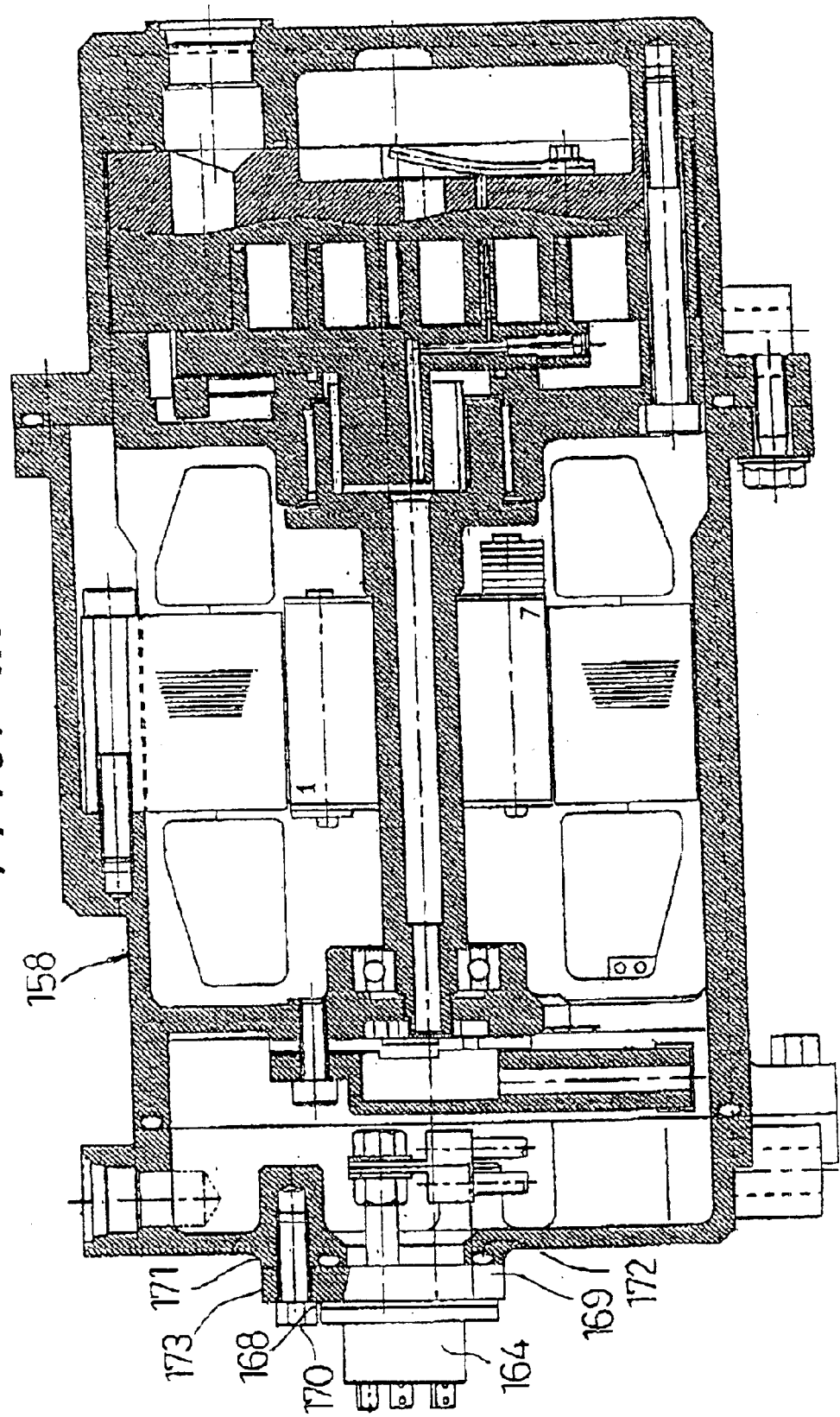
FIG. 15 is a side view showing a conventional compressor with a built-in electric motor housed in an aluminum container.

In the present embodiment, as shown in FIG. 1 to FIG. 3, FIG. 6, and FIG. 7, the installation flange 15a of the terminal 15 along with a sealing member 52 is pressed between a connection opening 51 provided on a part of the container 12, and an independent member 53 attached to this connection opening 51, to fix the terminal 15 and seal the connection opening 51. When the installation flange 15a is pressed by the independent member 53 engaged with the connection opening 51 of the container 12, and the terminal 15 is fixed in this way, this constitution is not subject to such a restriction as the material of the installation flange 15a is identical to the material of the container 12. This constitution is suitable to install the terminal 15 having the iron installation flange 15a shown in FIG. 1 to FIG. 7 on the aluminum container 12 shown in FIG. 1 to FIG. 6, and is applicable to the conventional terminal shown in FIG. 14.

Since the independent member 53 is engaged with the connection opening 51, namely they are engaged together, special installation members such as bolts, and an additional extending flange to be fixed with bolts are not necessary. Thus, a terminal installation part 101 does not become especially heavy or does not have an especially complicated structure. In addition, the independent member 53 presses the sealing member 52 simultaneously with the installation of the terminal 15, and seals the connection opening 51 of the container 12 without a special sealing operation.

The independent member 53 is engaged by screwing using threads 102. When the threads 102 have a fine lead, it is easy to provide a sufficient tightening force while hardly loosening. This screwing is suitable for fixing the independent member 53 itself, and the terminal 15, and sealing using the sealing member 52.

The engagement may be different types for preventing detachment such as a helicoid type, a bayonet type, and an engagement where a protrusion and an L shape groove are engaged with each other. These engagements may be discontinuous, or not all around. A double nut, which is not shown, may be screwed to the thread 102, so as to fasten the independent member 53 along with the connection opening 51 for preventing loosening. Paint or adhesive may be applied to an interface between the independent member 53 and the connection opening 51 for preventing loosening. These constitutions are suitable for preventing loosening when the terminal 15 is fixed, and the sealing member 52 is used for sealing. Application of adhesive may replace the sealing with the sealing member 52. In this case, it is preferable to apply the adhesive on the interface of the engaged surfaces continuously in the circumferential direction, and widely in the axial direction.

When the outer periphery of the independent member 53 and the inner periphery of the connection opening 51 are engaged using threads 102 as shown in FIG. 1, for example, since the independent member 53 has a circular shape, and the outer terminals 15c of the terminal 15 face outward, it is suitable for connecting external wirings 31 such as external leads. In this case, the independent member 53 is simply a circular member having a sufficient thickness for fixing itself and the installation flange 15a of the terminal 15. Thus, the independent member 53 is light and has a small volume. In the example shown in the drawings, the independent member 53 has a flange 53a opposing to the top end of the cylindrical connection opening 51, and the outer periphery of the flange 53a is made into a polygon such as a hexagon to easily fax and loose using the threads 102. As long as the outer terminals 15c do not interfere with the operation, the inner periphery of the flange 53a may be made as a polygon.

When the independent member 53 is used for fixing, screwing is preformed until the flange 53a is pressed against the top end of the connection opening 51 and tightened. In this state, the structure is designed such that a sufficient sealing state is guaranteed even if there is an error in pressing the sealing member 52, and the sealing member 52 is prevented from being excessively pressed so as not to decrease the life of the sealing member 52. Namely, when the independent member 53 is screwed up to a fastening limit, a fixed state and a sealed state sufficient for about ten years or the useful life of the maintenance-free compressor 11 can be provided.

There are no restrictions on the material of the independent member 53, as long as the fixing capability and sealing capability are not impaired when the independent member 53 is engaged and fixed. Thus, the material of the independent member 53 may be the same as that of the container 12, and the independent member 53 may be welded to the connection opening 51 formed integrally with the container 12. When one location is welded in the circumferential direction, the welded part serves as preventing the loosening described before. Depending on the weld strength of the weld joint, the independent member 53 may be fixed in a sufficient fixed and sealed state. When the weld joint continues in the circumferential direction, since the weld joint provides sealing capability, the sealing member 52 may be eliminated.

Figure 7B:
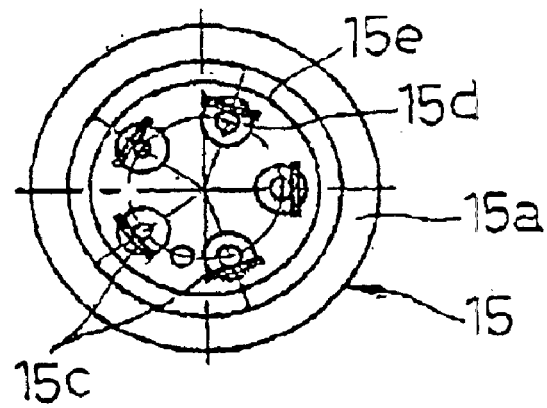
FIGS. 7A and 7B show a terminal of the compressor in FIG. 1, FIG. 7A being a side view of this terminal, and FIG. 7B a plan view thereof.
Figure 7A:
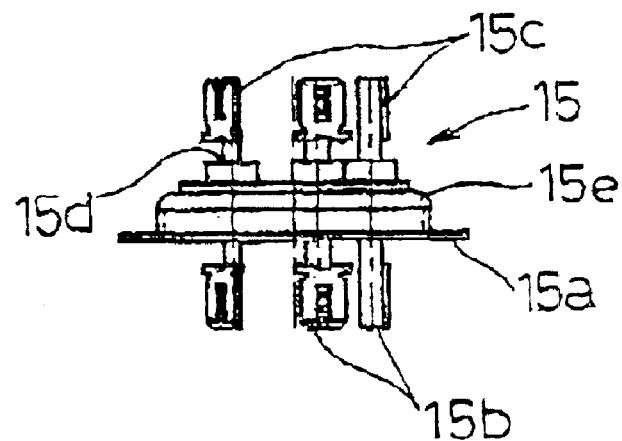

The installation flange 15a has a flat shape as shown in FIG. 1 and FIG. 7. A step surface 51a comes in contact with the flange 15a of the connection opening 51 when the independent member 53 is fixed. With this shape, when the installation flange 15a is pressed by the independent member 53, the installation flange 15a more surely comes in close contact with other members such as the independent member 53, the step surface 51a, and the sealing member 52 than the tapered conventional installation flange. Thus, the flat shape is advantageous for fixing and sealing the connection opening 51.

Figure 8B:
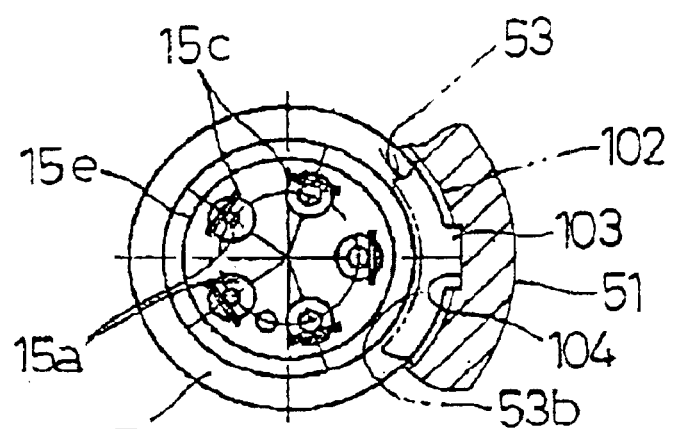
FIGS. 8A and 8B show another terminal, FIG. 8A being a side view of this terminal, and FIG. 8B a plan view thereof.
Figure 8A:
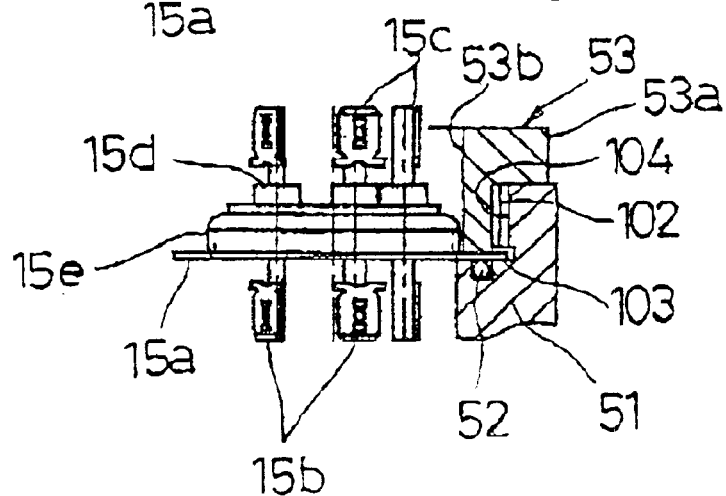

In an example shown in FIG. 8, the installation flange 15a has a directing part 103 for restricting the direction of the engagement with the connection opening 51. The directing part 103 includes a protruded piece protruding a part of the outer periphery of the installation flange 15a outward. The protruded piece engages with a groove 104 formed on a part of the inner periphery of the connection opening 51, to restrict the direction of the terminal 15 engaging with the connection opening 51 to a specific direction. Since this restriction maintains the directions and the positional relationship of the inner terminals 15b and the outer terminals 15c of the terminal 15 on the connection opening 51, it is suitable to easily connect the corresponding leads without errors. In the example shown in the drawing since the electric motor 13 is a three-phase AC electric motor, there are three inner terminals 15b and three outer terminals 15c for supplying electric power, and two inner terminals 15b and two outer terminals 15c for extracting a signal from a sensor for measuring the temperature of the electric motor 13. As a result, though connecting wires is complicated, the directing part 103 described above makes the wire connection easier. There is no specific requirement for the shape of the protruded piece.

The directing part 103 may be formed by cutting a part of the outer periphery of the installation flange 15a to form a flat edge on the outer periphery, or to form a recess. However, it is difficult to machine the connection opening 51 to be engaged with these parts for directing the terminal 15.

Figure 9B:
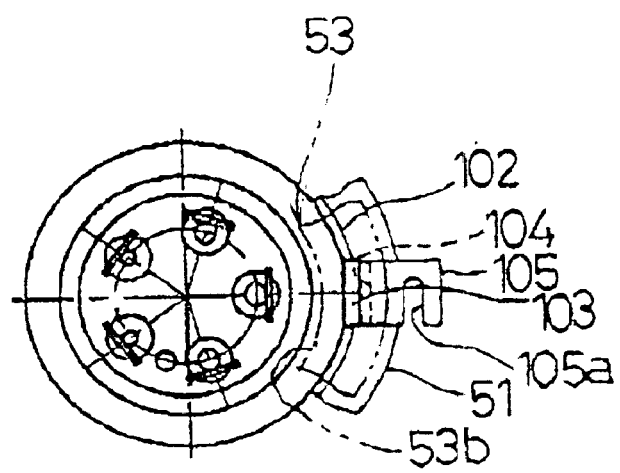
FIGS. 9A and 9B show another terminal, FIG. 9A being a side view of this terminal, and FIG. 9B a plan view thereof.
Figure 9A:
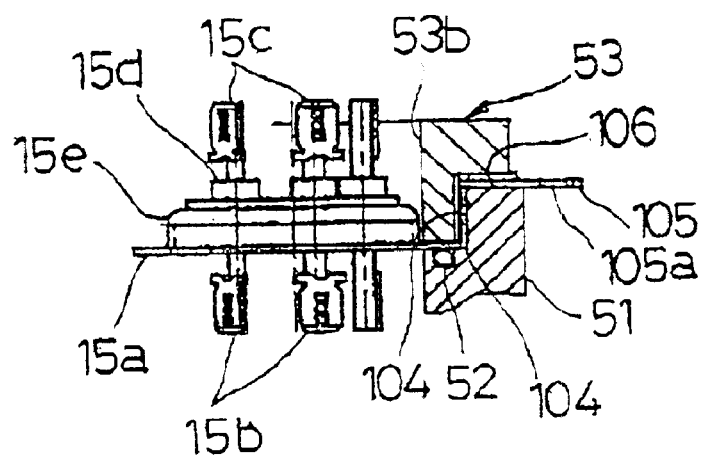

Though the independent member 53 and the terminal 15 may be fixed to the connection opening 51 of the container 12 from the inside, they are fixed from the outside in the example shown in FIG. 1 to FIG. 3, and FIG. 6. In this case, a routing fixture 105 for the external wirings 31 such as leads may be formed on the installation flange 15a of the terminal 15 as shown in FIG. 9. Specifically, in the example shown in the drawing, the directing part 103 is extended to integrally form the routing fixture 105. The routing fixture 105 extends outward from the outer periphery of the connection opening 51 through the groove 104 on thee inner periphery of the connection opening 51, and a groove 106 which continues from the groove 104, and is provided on the top end surface of the connection opening 51. The routing fixture 105 exists outside, and does not interfere with screwing the independent member 53. The external wirings 31 are,hooked to, or engaged with a wiring holder 105a cut out as a recess or a hole to maintain the external wirings 31 at a predetermined routing position.

When the independent member 53 and the terminal 15 are fixed to the connection opening 51 from the inside, it is effective to provide the directing part 103 and the fixture 105 on the installation flange 15a of the terminal 15. In this case, the fixture 105 fixes the routing of the internal wirings.

Conventionally, a dedicated fixture for leads was provided on a part of the outer surface of a container. On the other hand, the flange 15a of the terminal 15 is shared to provide the routing fixture 105. The structure for using the independent member 53 to fix the terminal 15, and to seal the connection opening 51 is used for making the routing fixture 105 function effectively. As a result, the external volume around the container 12, or bulkiness, is reduced.

When the independent member 53 and the terminal 15 are fixed to the connection opening 51 from the inside, an existing dead space inside the container 12 is used for this fixing, and the overall size is reduced. The internal pressure can be used advantageously as a sealing pressure for the connection opening 51.

Figure 11B:
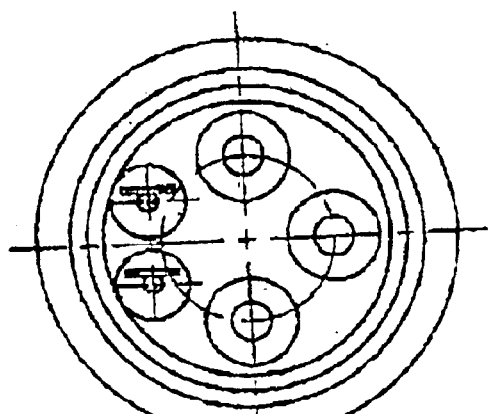
FIGS. 11A and 11B show still another terminal, FIG. 11A being a side view of this terminal, and FIG. 11B a plan view thereof.
Figure 11A:
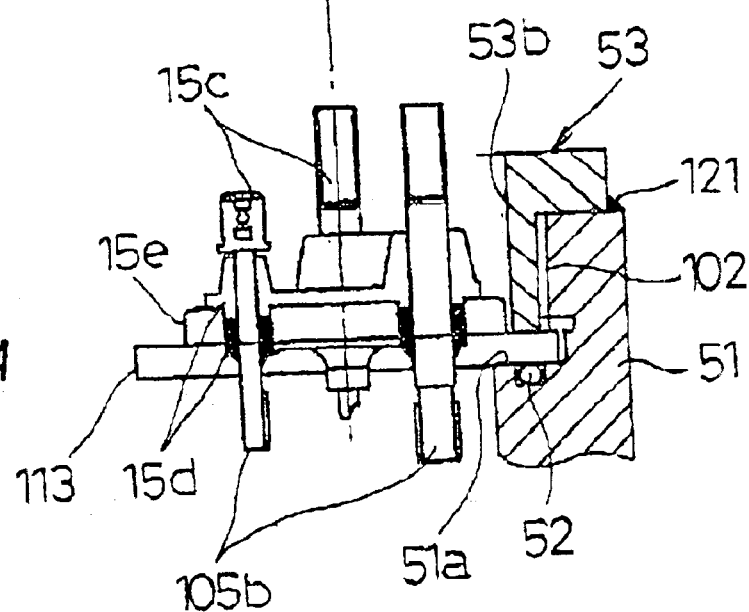

As shown in FIG. 10, in the variation, it is possible to provide the following modes. That is, a weld joint 111 is welded to the installation flange 15a of the terminal 15, and an installation plate 112 is fixed by the weld joint 111. Alternately, as shown in FIG. 11, the inner terminals 15b and the outer terminals 15c pass through the terminal 15, and a glass sealing material is used to form the sealing portions 15d at these through holes. The terminal 15 is provided on an installation plate 113. As shown in FIG. 10 and FIG. 11, the installation plate 112 or 113 along with the sealing member 52 is pressed between the connection opening 51 and the independent member 53 engaged with the connection opening 51 as in the examples described before. As a result, the installation plate 112 or 113 is fixed, and the connection opening is sealed.

In this way, when the installation plate 112 is welded to the installation flange 15a of the terminal 15, or the terminal 15 itself has the installation plate 113, effects similar to the example shown in FIG. 1 to FIG. 7 can be provided. When the installation flange 15a has the conventional tapered shape as shown in FIG. 10, the shape may be used to easily weld the installation plate 112, and the flat installation plate 112 is used for the installation. There are no restrictions on selecting the material of the installation plate 113 forming the terminal 15. When the installation plate 113 is made of the same material as that of the container 12, the installation plate 113 can be welded to the connection opening 51 whether the container 12 is made of iron or aluminum.

The directing part 103 and the routing fixture 105 which are provided on the installation flange 15a in the examples shown in FIG. 8 and FIG. 9 may be provided on the installation plates 112 and 113 configured as above.

Especially, no problems are caused when the independent member 53 is made of the same material as that of the container 12. Thus, as shown in FIG. 11, a weld joint 121 welded to the connection opening 51 formed integrally with the aluminum container 12 may be used to fix the installation plate 113. Even when the weld joint 121 is provided on a part of the independent member 53 and the connection opening 51, it prevents the loosening of the screwing. When the weld joint 121 is provided all around of the independent member 53 and the connection opening 51, and sufficient joint strength is secured, the engaging structure such as the threads 102 may be eliminated on the connection opening 51. In this way, since there are no restrictions on the material of the independent member 53, simple welding to the connection opening 51 fixes the terminal 15, and uses the sealing member 52 to seal the connection opening 51 without possibility of loosening. This feature can be applied to the examples shown in FIG. 1 to FIG. 10.

In the example shown in FIG. 10, a double nut 122 is screwed to the thread 102 of the independent member 53. When the terminal 15 is fixed by the independent member 53, and the sealing is completed by the sealing member 52, the double nut 122 is tightened against the connection opening 51, and the independent member 53 is fastened at the fixed position. Consequently, loosening of the independent member 53 is prevented.

Figure 12B:
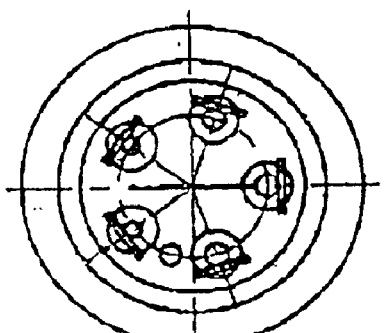
FIGS. 12A and 12B show another terminal, FIG. 12A being a side view of this terminal, and FIG. 12B a plan view thereof.
Figure 12A:
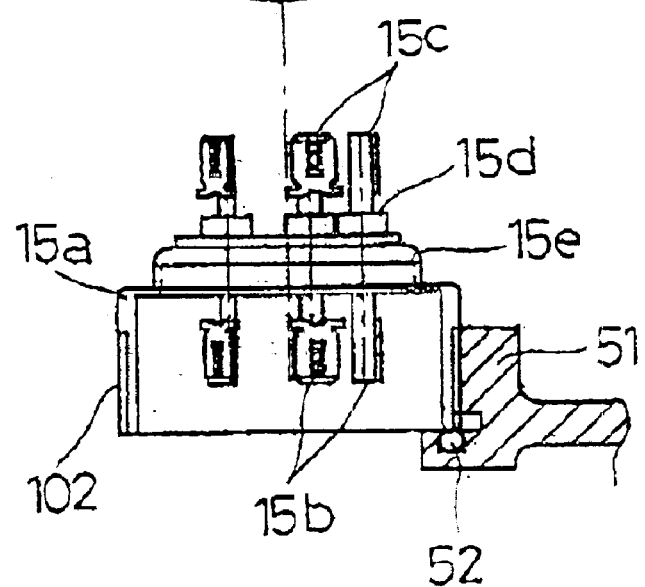

In the example shown in FIG. 12, the thread 102 is formed on the installation flange 15a of the terminal 15. The flange 15a is directly screwed to the connection opening 51. The flange 15a is fixed to the connection opening 51, and the sealing member 52 is pressed to seal the connection opening 51. With this example, though the installation flange 15a has to have a special shape, the terminal 15 made of iron is directly attached to the connection opening 51 formed integrally with the aluminum container 12 without causing a new problem in sealing technique, and is fixed and sealed using a simple structure. The thread 102 of the installation flange 15a may be formed by welding an independent member to the ready-made terminal 15.

In the respective examples shown in FIG. 1 to FIG. 12, the independent member 53 is installed on the connection opening 51 of the container 12 from the outside, and has an opening 53b for surrounding the outer terminals 15c of the terminal 15.

Figure 13:
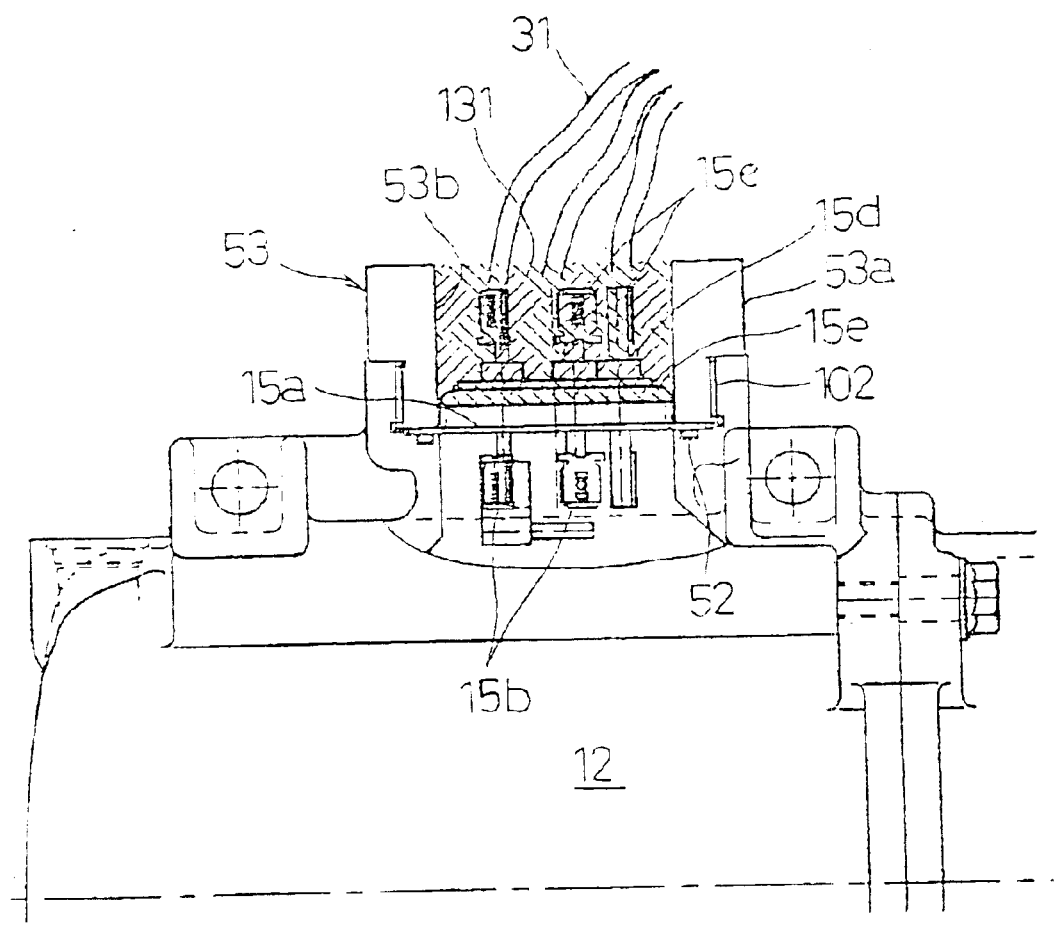
FIG. 13 is a cross-sectional view of a principal part of a terminal installation part to which resin mold is applied according to the embodiment shown in FIG. 1 to FIG. 7.

An example shown in FIG. 13 uses this feature, and employs resin mold 131 for covering connections between the outer terminals 15c and the external wirings 31 at the opening 53b. The independent member 53 for fixing the terminal 15 and sealing the connection opening 51 is used to resin-mold the connections between the outer terminals 15c and the external wirings 31, thereby it is possible to secure sufficient water resistance with ease.

Epoxy resin is used as the resin mold 131, for example. Since this resin mold 131 is excellent in water resistance in addition to insulation capability and adhesive strength, hardly cracks, and has heat resistance, sufficient durability is added to the maintenance-free compressor.

The connection opening 51 of the container 12 may be provided on the body of the container 12 as shown in FIG. 1 to FIG. 6, or may be formed on an end. When the connection opening 51 is provided on the body, the dimension of the compressor 11 may be appropriately reduced in the axial direction. When the connection opening 51 is provided on the end, the operation for fixing the terminal 15 from the inside is easy.

In the compressor of the present embodiment, as shown in, FIG. 1, the suction port 16, the discharge port 17, the terminals 15 provided as inner and outer electric connection parts, and the mounting legs 25 of the container 12 are provided on the same side of a body of the container 12. In other words, the suction port 16, the discharge port 17, the terminal 15 connecting between the outside and the inside, and mounting legs 25 are arranged and concentrated on the same side of the body of the container 12 as shown in FIG. 1 to FIG. 3, and FIG. 6. Since they do not protrude in the axial direction from the ends, the overall dimension in the axial direction is reduced approximately to the dimension of the container 12 in the axial direction. With the concentrated arrangement, since the suction port 16, the discharge port 17, the terminal 15, and the mounting legs 25 are close to one another, the wall of the container 12 in the thickness direction can be shared entirely or partially as respective installation areas to reduce the wall dedicated for providing them on the container 12. Since the suction port 16 and the discharge port 17 are placed on the body of the container 12, and the outer periphery of the ends of the container 12 tends to have dead spaces 26, connection margins S for connecting with the external pipes 20 may be provided inside. As a result, a wide part on the wall of the container 12 in the thickness direction can be shared as shown in FIG. 1 compared with a case where the connection margins S extend outward. Thus, the overall container 12 is made slim and light. In addition, since the suction port 16 and the discharge port 17 do not protrude outward, the overall bulkiness is reduced accordingly.

As a result, it is possible that the compressor 11 with a built-in electric motor becomes compact and light, reduces its cost, is easily mounted on a mobile structure such as the vehicle 27, and contributes to energy saving.

The suction port 16, the discharge port 17, the terminal 15, and the mounting legs 25 are individually arranged in the axial direction of the container 12. With this concentrated arrangement, since their concentration around the container 12 increases, this arrangement is more advantageous for reducing the size and the weight.

One mounting leg 25 and the suction port 16 are paired, and the other mounting leg 25 and the discharge port 17 are paired. The individual pairs are provided on the both sides of the body of the container 12 in the lengthwise direction. The terminal 15 is provided between these pairs. With this arrangement, since the terminal 15, which tends to protrude outward, is positioned in a dead space 29, which takes different forms, between mounting portions 28 constituted by the mounting legs 25, the compressor 11 does not obstruct other objects when the compressor 11 is installed in the narrow vehicle 27. Also, it is easy to protect the wirings 31 externally connected and their connections from an unexpected external force.

As shown in FIG. 1 to FIG. 3, and FIG. 6, the suction port 16 and the discharge port 17 are placed on the outermost parts of the container 12, namely on the both ends with this constitution, the external pipes 20 for the refrigerating cycle can be easily connected and disconnected outside the two mounting legs 25 on both sides of the connector 15 without being obstructed by the external wirings 31 to the terminal 15, and the two-mounting portions 28.

The container 12 is made of aluminum, which is advantageous for reducing the weight. Because of the moldability of aluminum, the mounting legs 25 and the connection opening 51 cylindrically protruding for installing the terminal 15 are integrally formed with the container 12 as shown in FIG. 1 to FIG. 6. Since an operation for installing independent legs separately is not necessary, and there is no factor for increasing the weight such as installing the legs separately by means of welding or using bolts, this constitution is effective for reducing the weight. When the mounting legs 25 are directly attached to an engine 2 of the vehicle 27 as in the present embodiment, it is easy to avoid the insufficient strength of the legs 25 which may be caused when the legs are installed separately. Also the legs 25 are formed as dedicated legs suitable for directly installing on the engine 2. A pair of mounting legs 32 are formed on the container 12 on the opposite side of the mounting legs 25 with respect to the lengthwise axis.

When the container 12 is made of aluminum, and the mounting legs 25 and 32 are formed integrally, there are such advantages as the structure becomes simple, the cost does not increase, the sufficient strength is secured, and the weight is reduced. Thus, this constitution is optimal for such an application as directly mounting the compressor 11 on the engine 2 of the vehicle 27 where the mounting strength is important.

The mounting legs 25 and 32 are provided at positions approximately symmetrical about a line vertically passing through the center of the gravity G of the compressor 11. The mounting legs 25 and 32 slightly protrude from the container 12 perpendicularly to the axis of the compressor 11. However there are no restrictions on the specific shape of the mounting legs 25 and 32. The connection opening 51 is placed on the side of the compression mechanism 10 of the electric motor 13, and is close to a coil end 13a. This placement is determined for facilitating the connection of a connection terminal 13b of the coil end 13a with the terminal 15.

A sub bearing part 42 is provided on an end wall 41 integrally formed with the body of the container 12 in the compressor 11 with a built-in electric motor of the present embodiment. The sub-bearing part 42 supports the sub-axial portion 14a of the drive shaft 14 with a sub bearing 23. A pump chamber 43 is opened on an outer surface 41a of the end wall 41, and contains the pump 19 as a pump mechanism. The pump 19 is connected with the sub-axial portion 14a of the drive shaft 14. An opening 43a of the pump chamber 43 is blocked by a closing member 44.

With this constitution, as shown in FIG. 1, the sub-axial portion 14a drives the pump 19, and the sub bearing part 42 is placed on the side of the sub-axial portion 14a of the drive shaft 14. The sub bearing part 42 and the pump 19 including the pump chamber 43 are arranged and concentrated on the end wall 41 of the container 12. As a result, these individual elements come close to one another, so as to share a part of or all of the wall of the container 12 in the thickness direction. In addition, they share a part of or all of a space in the container 12 in the axial direction. Thus, a dedicated thick part and a dedicated space occupying in the container 12 are reduced accordingly. As a result, the dimension of the container 12 in the axial direction is reduced. Simultaneously, the overall weight of the container 12 is reduced. Because of these points, the size, weight, and cost of the compressor 11 with a built-in electric motor 11 are reduced, and the compressor 11 is easily mounted on a mobile structure such as the vehicle 27, and contributes to energy saving.

Since the sub bearing part 42 of the drive shaft 14 is integrated into the end wall 41 of the container 12, it is not necessary to position the sub bearing part 42 and the sub bearing 23 with respect to the container 12. As a result, positioning precision increases, the assembling becomes easy, and the cost is reduced accordingly.

Though the pump chamber 43 is integrally provided on the end wall 41 of the container 12, the pump chamber 43 opens outward on the end wall 41 of the container 12. Thus, it is easy to engage the pump 19 from the outside separately, and to connect the pump 19 with the sub-axial portion 14a of the drive shaft 14 supported by the bearing on the end wall 41. After the connection, the pump chamber 43 is closed using the closing member 44. The assembling operation therefor is not especially complicated, or does not take time. The container 12 can be separated at a part of the body into a container main body portion 12a and a lid portion 12b as shown in FIG. 1 to FIG. 3, and FIG. 6. The container main body portion 12a and the lid portion 12b are connected later. Since the number of the connection portion 45 of the container 12 is reduced, to one, the number of the flanges 46 for the connection, and the number of bolts 47 for fastening the flanges 46 is reduced for reducing the size and the weight further. The number of the bolts 47 is four in the example shown in FIG. 5. The pair of mounting legs 25 and the pair of mounting legs 32 provided along the axial direction of the container 12 are not placed across the separation of the container 12, namely the connection portion 45, and are arranged and concentrated on one side of the separated part, namely on the container main body portion 12a in the example shown in the drawing. When the compressor 11 is installed on the engine 2, and is supported by the mounting legs 25 or 32, the load is not applied to the connection portion 45 between the container main body portion 12a and the lid portion 12b of the separated container 12. Therefore, for the bolts 47 at the connection portion 45, it is not necessary to consider the load caused by installing and supporting the compressor 11. The strength required for connecting the container main body portion 12a and the lid portion 12b with each other is determined based only on the pressure-proof to refrigerant. A sealing member 85 is provided on the connection portion 45. The sealing member 85 is attached to a groove on a side of the lid portion 12b.

Figure 4:
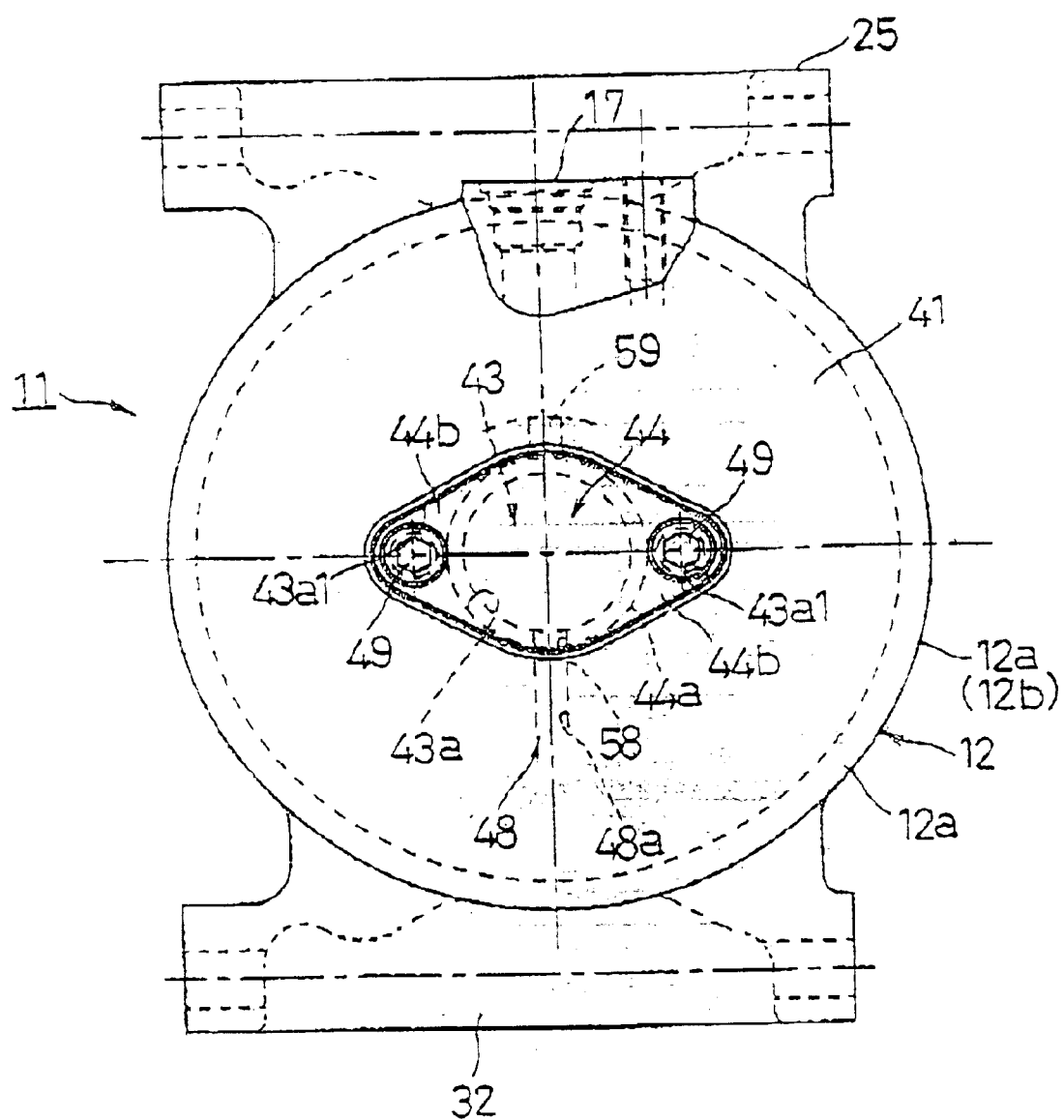
FIG. 4 is a side view of the compressor in FIG. 1 seen from one side.
Figure 5:
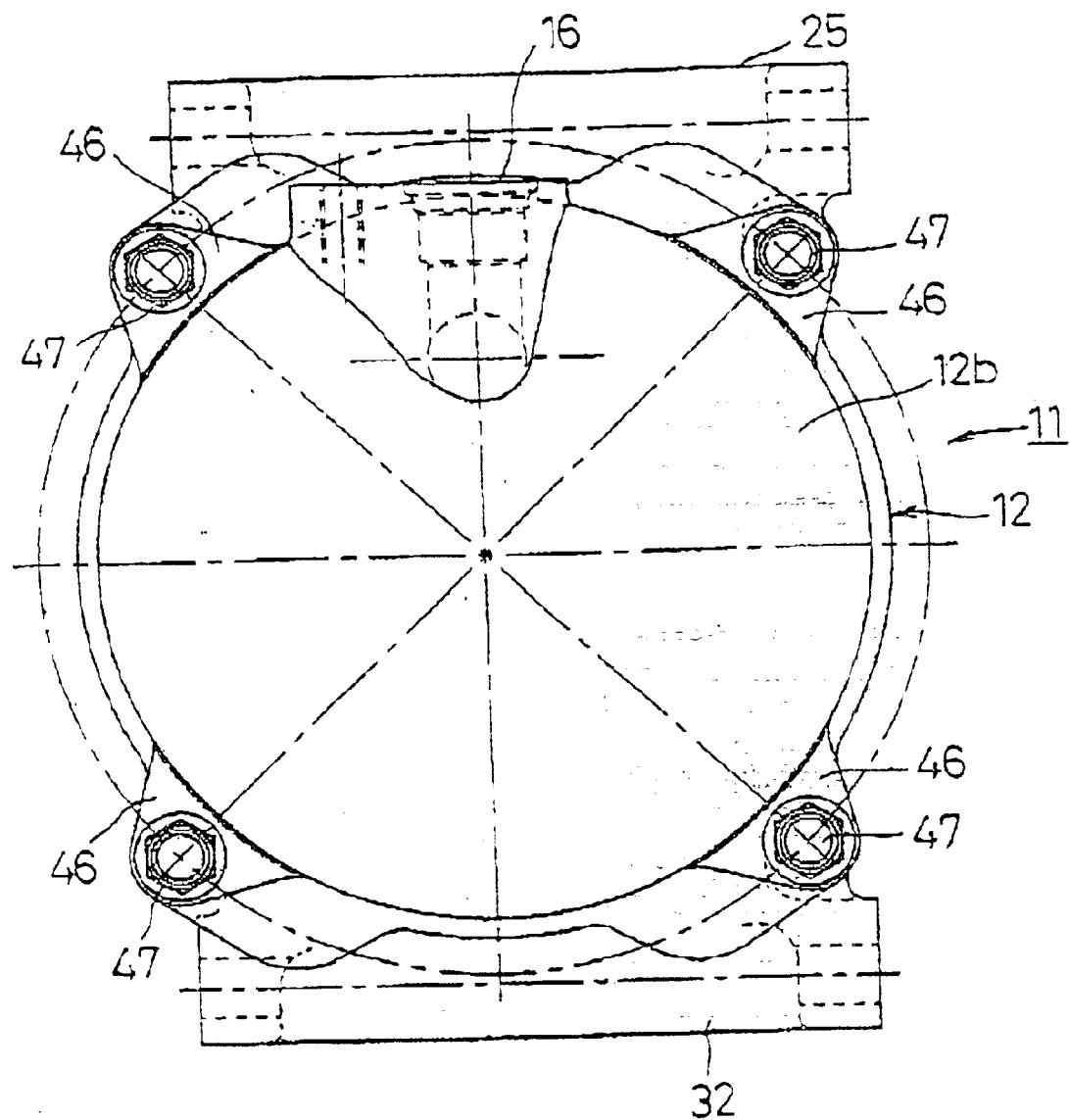
FIG. 5 is a side view of the compressor in FIG. 1 seen from the other side.
Figure 6:
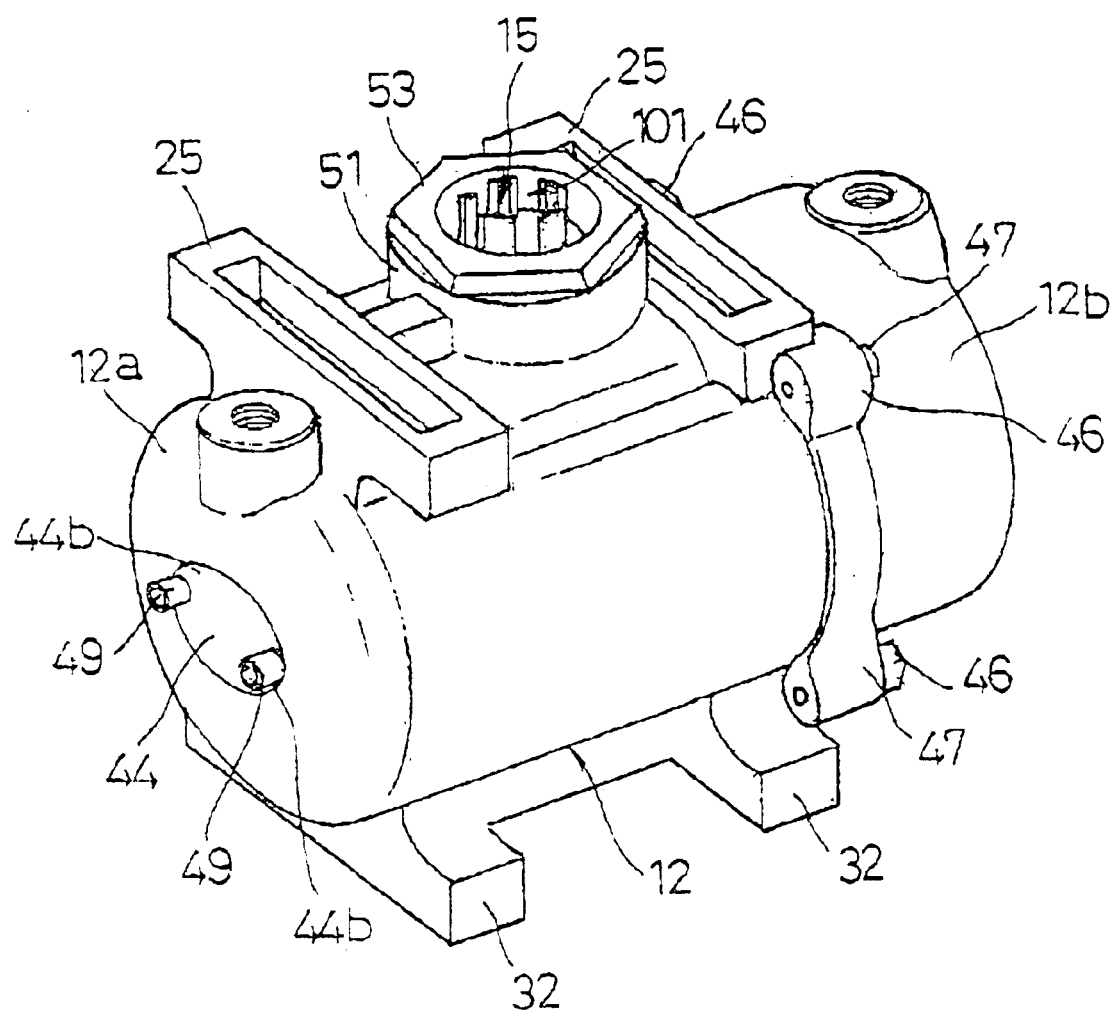
FIG. 6 is a perspective view of the compressor in FIG. 1.

The pump chamber 43 is formed integrally on the end wall 41 as a circular recessed portion extending straight toward the inside from the opening 43a on the outer surface 41a of the end wall 41. The sub-axial portion 14a of the drive shaft 14 faces a back wall 41b. The pump 19 connected with the sub bearing part 14a is constituted between the end wall 41 and a cover plate 54 attached to the back wall 41b from the outside. A suction port 19a opening to the pump chamber 43 is formed on the cover plate 54. The closing member 44 has a plug portion 44a engaged with the pump chamber 43 at a portion from the opening 43a to a predetermined position in the depth direction. A sealing member 55 seals between the outer periphery of the, plug portion 44a, and the inner periphery of the pump chamber 43, so as to make the pump chamber 43 airtight. The sealing member 55 is installed in an outer peripheral groove of the plug portion 44a. A flange portion 44b extending on the both sides in the radial direction is integrally formed on an external end of the plug portion 44a of the closing member 44 as shown in FIG. 1, FIG. 4, and FIG. 6. The flange portion 44b is fastened to the end wall 41 with bolts 49 while the flange portion 44b is engaged with a recessed portion 43a 1 extending from the opening 43a on the both sides. The closing member 44 maintains the sealed state of the pump chamber 43.

The closing member 44 may be smaller than the end wall 41, and may be positioned in the center of the end wall 41. The closing member 44 is fixed on the end wall 41 by two or a few bolts 49, or by being screwed into the opening 43a. In this way, the pump chamber 43 is sealed easily and surely only by fixing the closing member 44 to the pump chamber 43, and this constitution does not make the assembly of the container 12 difficult, and does not increase the weight and the size of the container 12.

An oil passage 48 is formed on the end wall 41 of the container 12 for communicating the pump chamber 43 to the oil storage portion 24 in the container 12 as shown in FIG. 1. In this way, the oil passage 48 which might extend to the bottom of the oil storage portion 24 for the pump 19 to suck the oil 18, and might have a suction port 33 at the bottom is formed in the wall of the container 12 to be shared. Thus, the size and the weight of the container 12 are reduced furthermore.

The oil passage 48 has a passage portion 48a communicating to the discharge port 17 through the pump chamber 43 along an axial line 56 shown in FIG. 1. The discharge port 17 exists in a neighborhood of the pump chamber 43 on the end wall 41 of the container 12, and opens on the outer periphery of the container 12. The axial line 56 coincides with, or is shifted more or less from the center of the discharge port 17. The passage portion 48a is machined from the pump chamber 43 to the vicinity of the bottom of the oil storage portion 24 along the axial line 56 by perforating from the outside through the discharge port 17. A passage portion 48b is formed by perforating from the bottom of the oil storage portion 24 inside the container 12. Thereby, the oil passage 48 connecting the pump chamber 43 and the oil storage portion 24 can be formed without difficulty by connecting the passage portion 48a and the passage portion 48b.

The closing member 44 is placed at a predetermined fixed position to block the oil passage 48 from the discharge port 17, and to bring the oil passage 48 in communication to the pump chamber 43 as shown in FIG. 1. Specifically, the plug portion 44a of the closing member 44 has a hollow inside, and extends across the pump chamber 43 as shown in FIG. 1 and FIG. 4 to secure a wide space for the pump chamber 43. Using such a constitution, a communication pore 58 communicating to the passage portion 48a of the oil passage 48 is provided only on a circumferential point on the peripheral wall of the plug portion 44a. This allows the oil passage 48 to communicate to the pump chamber 43 through this communication pore 58. An upper loophole 59 formed on the upper side on the pump chamber 43 when the passage 48 is bored is blocked by the engagement between the peripheral wall of the plug portion 44a and the inner periphery of the pump chamber 43. A sealed portion by the sealing member 55 exists on the side of the outer surface 41a of the end wall 41 with respect to the communication pore 58 and the loophole 59.

With this constitution, after the loophole 59 communicating to the discharge port 17 and the inside of the container 12 is formed by perforating through the discharge port 17 in the pump chamber 43, when the closing member 44 is fixed to the predetermined position, the loophole 59 is blocked. Therefore, the oil passage 48 is formed so as to communicate only to the pump chamber 43 without a special member or operation for closing the loophole 59.

An oil filter 61 is provided in the pump chamber 43 as shown in FIG. 1. The oil filter 61 is installed such that its outer periphery along with the cover plate 54 of the pump 19 is held between the plug portion 44a of the closing member 44 and the back wall 41b. The oil filter 61 covers the small suction port 19a of the pump 19 across a wide area using the space of the pump chamber 43. With this constitution, using the wide pump chamber 43, the oil filter 61 can have a large area for passing liquid compared with a conventional oil filter provided at a suction port of a narrow oil passage. Consequently, a resistance of the oil filter 61 for passing liquid can be reduced, the life of the oil filter 61 caused by the clogging can be prevented from being shortened, and the oil 18 is stably supplied for a long period.

As shown in FIG. 1, there is an inner opening 17a of the discharge port 17 on the inner surface of the end wall 41 of the container 12. An oil separator 62 is provided for the inner opening 17a inside the end wall 41 with a gap 64 for routing the refrigerant. The oil separator 62 may be a plate, and prevents the refrigerant from flowing in, and separates the oil 18. In the example shown in the drawing, the oil separator 62 is installed on an installation surface 65 using a bolt 63. The installation surface 65 protrudes toward the inside slightly from the inner opening 17a on the end wall 41. When the oil separator 62 is provided close to the inner opening 17a of the discharge port 17 formed on a thick part of the end wall 41, it is not necessary to prepare an independent part for installing the oil separator 62. The oil separator 62 prevents the refrigerant from directly flowing into the discharge port 17, makes the refrigerant collide with the oil separator 62 itself, and separates oil component accompanied with the refrigerant.

The connection portion 45 of the container 12 is provided at one location on the body of the container 12 between the electric motor 13 and the compression mechanism 10 as shown in FIG. 1. When the container 12 is constituted as two separated parts in this way, the stators 13c of the electric motor 13 are fixed to the container main body portion 12a with bolts, thermal insert, or welding. Thus, a rotor 13e and the drive shaft 14 are combined and supported without problems. After the main axial part 14b of the installed drive shaft 14 is connected with the compression mechanism 10, the remained lid portion 12b is connected. As a whole, the compressor 11 can be easily fabricated, compared with the conventional one.

The main bearing 21 is provided on the drive shaft 14 on the side of the compression mechanism 10. The container main body portion 12a of the container 12 has a storage space for fixing a main bearing member 71 for supporting the main bearing 21 as shown in FIG. 1. Bolt fastening, thermal insert, or welding is used for fixing the main bearing member 71. With this constitution, the electric motor 13, the drive shaft 14, and the bearing parts on the both ends of the drive shaft 14 are precisely and easily positioned with respect to the single container main body portion 12a. Then, the compression mechanism 10 is positioned with respect to the main bearing member 71 using bolts 72, and is connected with the driving side, which is previously positioned and fixed. Then, the lid portion 12b is connected with bolts 47. Thus, the assembling becomes even easier.

In the embodiment shown in the drawing, the compression mechanism 10 is a scroll type one and is constituted by holding a swing scroll 74 between a fixed scroll 73 fixed to the main bearing member 71 with the bolts and the main bearing member 71. Spiral wings of the fixed scroll 73 and those of the swing scroll 74 are meshed with each other. The compression mechanism 10 is assembled before the main bearing member 71 is built into, and fixed to the container main body portion 12a. The compression mechanism 10 is attached to the lid portion 12b along with the main bearing member 171 using bolts or the like. Then, the compression mechanism 10, the main bearing member 71, and the cover 12, which are assembled as a body, are attached to the container main body portion 12a. The main axial part 14b includes an eccentric shaft 14c for driving the scroll type compression mechanism 10. The eccentric shaft 14c is engaged with the swing scroll 74 through the bearing 22. The rotating of the shaft 14 turns the swing scroll 74 along a circular orbit. A rotation-preventing mechanism 75 is provided between the main bearing member 71 and the swing scroll 74 for preventing an undesired rotation of the swing scroll 74 while the swing scroll 74 is at the time of swing motion.

When the swing scroll 74 starts its swing motion, a compression chamber 76 between the swing scroll 74 and the fixed scroll 73 moves from the outer peripheral portion to the center portion while reducing its volume. As a result, the refrigerant is sucked from the suction port 77 on the outer periphery, and is compressed. The refrigerant which has reached a predetermined pressure is discharged from the discharge port 78 in the center portion into the container 12 through a lead valve 79.

The suction port 16 of the container 12 is arranged to extend in a dead space 26 of the outer periphery of the container 12, and is formed sharing a thick part on the other end wall 81 of the lid portion 12b. The opening 16a of the suction port 16 on the inner surface of the end wall 81 is positioned such that the opening 16a is directly connected with the suction port 77 of the compression mechanism 10. An area between the compression mechanism 10 and the lid portion 12b is automatically separated into an inlet passage 82 and an discharge chamber 83 for the refrigerant without a dedicated member. The refrigerant discharged into the discharge chamber 83 reaches the electric motor 13 through a passage 84 provided in the compression mechanism 10 and the main bearing member 71 or between the compression mechanism 10 and the container 12, and between the main bearing member 71 and the container 12. After the refrigerant cools the electric motor 13, the refrigerant reaches the discharge port 17 of the container 12.

As described above, the compressor 11 with the built-in electric motor 13 is suitable for a mobile structure used along with a mobile battery 1. The compressor 11 with the built-in electric motor 13 is suitable to constitute a mobile structure such as a vehicle 27 along with the battery 1.

The vehicle 27 is not limited to a specific one, but may be a gasoline-powered vehicle, a hybrid vehicle, or an electric-powered vehicle. The compressor 11 can be applied to other types of vehicles such as working-purpose vehicles and special-purpose vehicles.

The first feature of the present invention is suitable to attach a terminal with a iron flange to an aluminum container, and is applicable to a conventional terminal. Simultaneously, an installation part of the terminal is not especially heavy or does not have an especially complicated structure. Further, the independent member presses the sealing member simultaneously with the installation of the terminal, and realizes a sealing structure at the connection opening which does not require a special sealing operation.

With the second feature of the invention, the connection opening is sealed whether the flange has a conventional taper shape or not.

With the third feature of the invention, since there are no restrictions on the material of the independent member, simple welding fixes the terminal to the connection opening, and the connection opening is sealed with the sealing member without possibility of loosening.

With the fourth feature of the invention, since the independent member as in the case of the first feature is not necessary, an installation plate of the independent member attached to the terminal separately is used to provide action and effects similar to those of the first feature.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A compressor with a built-in electric motor comprising:
a compression mechanism;
a built-in electric motor for driving the compression mechanism;
a container housing the compression mechanism and the electric motor together inside walls of the container; and
a terminal installed on a part of the container for electrically connecting the electric motor through the walls of the container with the outside of the container, the terminal having an installation flange and the container including a ring shaped connection opening formed thereon, wherein
the installation flange of said terminal is pressed along with a sealing member between the connection opening of the container and a ring shaped independent member outside of the installation flange engaged with and substantially coaxial with the ring shaped connection opening to affix the terminal and seal the connection opening.

2. The compressor with a built-in electric motor according to claim 1, wherein the independent member is screwed into said connection opening.

3. The compressor with a built-in electric motor according to claim 1, wherein the engagement is conducted between an outer periphery of the independent member and an inner periphery of the connection opening.

4. The compressor with a built-in electric motor according to claim 1, wherein the installation flange has a flat shape.

5. The compressor with a built-in electric motor according to claim 1, wherein the installation flange has a directing part for restricting a direction of the engagement with the connection opening of the container.

6. The compressor with a built-in electric motor according to claim 1, wherein the independent member and the terminal are affixed to the connection opening of the container from the outside of the container.

7. The compressor with a built-in electric motor according to claim 6, wherein the independent member has an opening for surrounding an outer terminal of said terminal, and a connection between the outer terminal and an external electrical lead is covered with resin mold in said opening.

8. The compressor with a built-in electric motor according to claim 6, wherein the independent member has a fixture for an external lead.

9. The compressor with a built-in electric motor according to claim 1, wherein the independent member and the terminal are affixed to the connection opening of the container from the inside of the container.

10. The compressor with a built-in electric motor according to claim 1, wherein the flange of the terminal is made of an iron material, and the container is made of an aluminum material.

11. The compressor with a built-in electric motor according to claim 7, wherein the resin mold is an epoxy resin.

12. The compressor with a built-in electric motor according to claim 1, wherein the compressor is used together with a mobile battery.

13. A mobile structure including the compressor with a built-in electric motor according to claim 1 along with a battery.

14. A compressor with a built-in electric motor comprising:
a compression mechanism;
a built-in electric motor for driving the compression mechanism;
a container for housing the compression mechanism and the electric motor; and
a terminal installed on a part of the container for electrically connecting the electric motor with the outside of the container, wherein
an installation plate welded to an installation flange of the terminal is pressed along with a sealing member between a ring shaped connection opening provided on a part of the container and a ring shaped independent member provided outside of the installation flange and the installation plate engaged with and substantially coaxial with the ring shaped connection opening to affix the terminal and seal the connection opening.

15. A compressor with a built-in electric motor comprising:
- a compression mechanism;
- a built-in electric motor for driving the compression mechanism;
- a container housing the compression mechanism and the electric motor together inside walls of the container; and
- a terminal installed on a part of the container for electrically connecting the electric motor through the walls of the container with the outside of the container, wherein
- an installation flange of said terminal, an installation plate welded to the installation flange of the terminal, or an installation plate forming an element of said terminal is pressed along with a sealing member between a connection opening provided on a part of the container, and an independent member welded to the connection opening to affix the terminal and seal the connection opening.

16. A compressor with a built-in electric motor comprising:
- a compression mechanism;
- a built-in electric motor for driving the compression mechanism;
- a container housing the compression mechanism and the electric motor together inside walls of the container; and
- a terminal installed on a part of the container for electrically connecting the electric motor through the walls of the container with the outside of the container, wherein
- an installation flange of said terminal, an installation plate welded to the installation flange of the terminal, or an installation plate forming an element of said terminal is engaged with a ring shaped connection opening provided on a part of the container, and is affixed while a sealing member is pressed said installation flange or said installation plate between a ring shaped independent member outside the installation flange and said ring shaped connection opening to seal the connection opening, wherein said ring shaped independent member and said ring shaped connection opening are substantially coaxial.

17. The compressor with a built-in electric motor according to claim 16, wherein the terminal is affixed to the connection opening of the container from the inside or from the outside of the container.

18. The compressor with a built-in electric motor according to claim 16, wherein a connection between an outer terminal of said terminal and an external electrical lead is covered with resin mold at the connection opening of the container.

19. The compressor with a built-in electric motor according to claim 17, wherein the terminal or the installation plate has a routing fixture for an external lead.

\* \* \* \* \*